March 22, 1966 E. C. JACOBSEN 3,241,416
CLICKING MACHINE

Filed Oct. 7, 1963 3 Sheets-Sheet 1

March 22, 1966 E. C. JACOBSEN 3,241,416
CLICKING MACHINE

Filed Oct. 7, 1963 3 Sheets-Sheet 2

March 22, 1966  E. C. JACOBSEN  3,241,416
CLICKING MACHINE
Filed Oct. 7, 1963  3 Sheets-Sheet 3

United States Patent Office 3,241,416
Patented Mar. 22, 1966

3,241,416
CLICKING MACHINE
Erik Chresten Jacobsen, Hong, Denmark, assignor to
Vilhelm Pedersen A/S, Hong, Denmark
Filed Oct. 7, 1963, Ser. No. 314,558
Claims priority, application Denmark, Oct. 10, 1962,
4,371/62
2 Claims. (Cl. 83—522)

The invention relates to an electrically controlled hydraulic clicking machine or perforation machine, more particularly a clicking machine with a swinging beam for use in cutting blanks from leather, textiles, carboard, plastics or metal foil.

Desirable features are for such clicking machines to be adjustable both as regards the length of stroke and the depth of the clicking stroke and for these adjustments to be made in an easy and handy way by the operator, and this has also been achieved to a certain extent in the clicking machines hitherto known. Thus, machines are known for cutting the above-mentioned materials or similar materials in which a press device in the shape of a swinging arm is moved hydraulically in relation to a work support consisting of a stationary table, and in which the cutting is effected by a cutting tool fitted between the table and the cutting beam, for instance a cutting die, which by the cutting beam is pressed down against the table through the material, and in which the starting position of the cutting beam is adjusted in accordance with the thickness of the work material and the height of the cutting die by manual operation of a hand wheel at the end of the hydraulically operated column to which the cutting beam is fitted, the hydraulic column carrying the cutting beam being mounted on a threaded spindle. When the clicking machine is to be used for works requiring the use at short intervals of various cutting dies of varying height, the resultant necessary manoeuvring of the adjusting hand wheel will however cause fatigue and be disproportionately time-consuming in relation to the cutting process itself.

It has therefore been suggested to provide such clicking machines with an electrical control circuit controlling the driving mechanism, the work support being made electrically conductive, and the electrical control circuit being arranged for a circuit to be closed when the cutting die strikes the work support, whereby some relays are activated and change the direction of the movement of the cutting beam.

The electrical and electronic equipment required in this connection is rather vulnerable and is further complex and consequently expensive, and it further implies the draw-back that the stopping of the arm on its downward movement often occurs too early, which is due to the fact that the conductive part of the surface of the work support will rather quickly be cut to pieces, and cuttings or chips torn up from the metallic surface will close the circuit before the cutting beam has reached the bottom of its stroke.

A primary object of the invention is to reduce the time required for adjustment to a minimum.

Another object is to make the cutting process so quick and reliable an operation as possible without disregarding the safety requirements for the operator.

A further object is to make the adjustment more handy for the operator.

A further object is to concentrate the necessary adjusting devices in an easily accessible place for the operator.

A further object is to produce a clicking press of the kind in question in which the cutting stroke and the starting position of the cutting beam can easily and quickly be adjusted to the cutting die used at any time.

A further object is to produce a clicking press in which the entire adjustment of the extereme positions of the cutting beam is arranged in a manually operated adjustment device for the electrical control system.

A further object is to produce a clicking press with an indicator which directly shows the height of the cutting die in its true size and in which the cutting die itself can be used for defining the adjustment.

Figure 1:
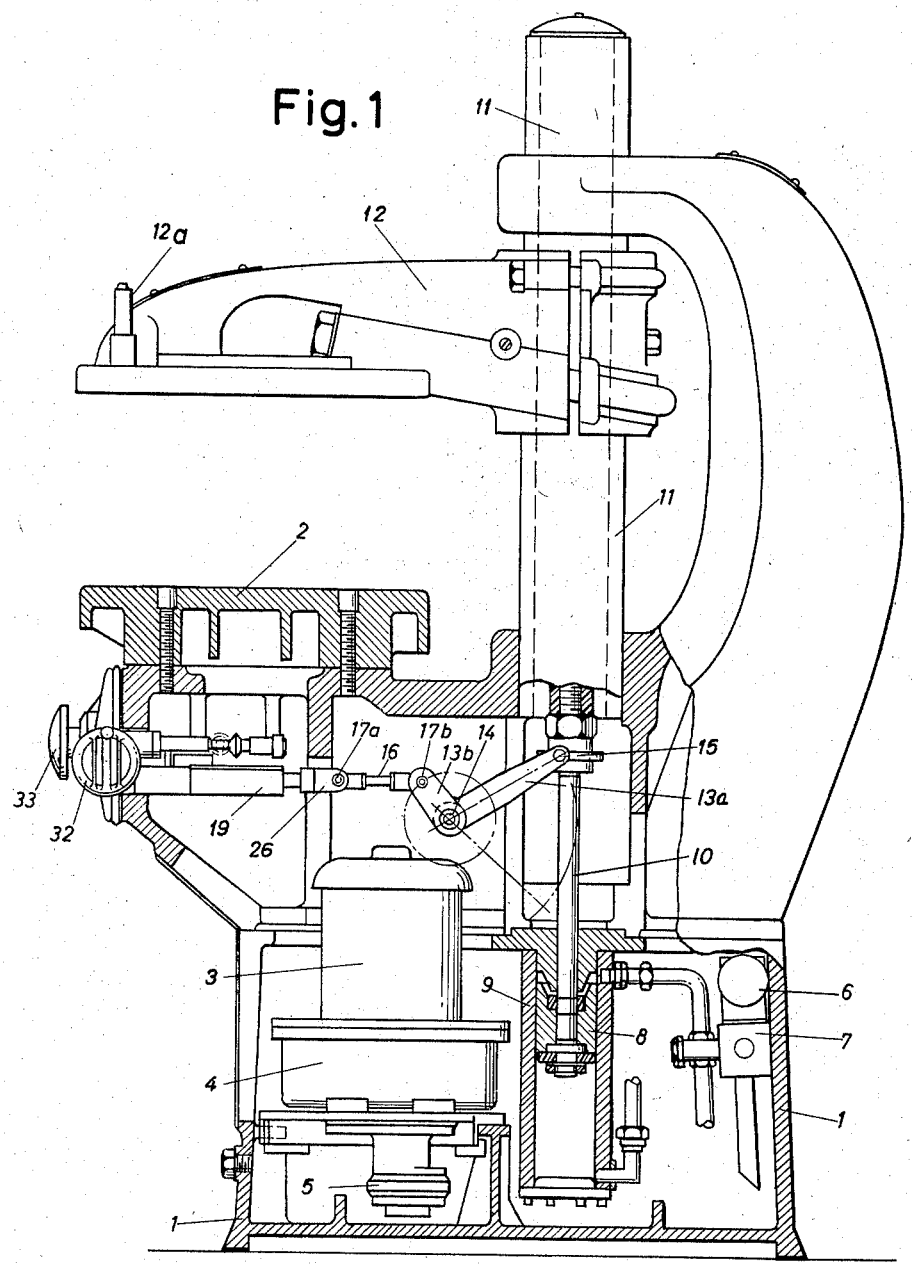
FIGURE 1 illustrates partly in elevation and partly in section a press according to the present invention.
Figure 2:
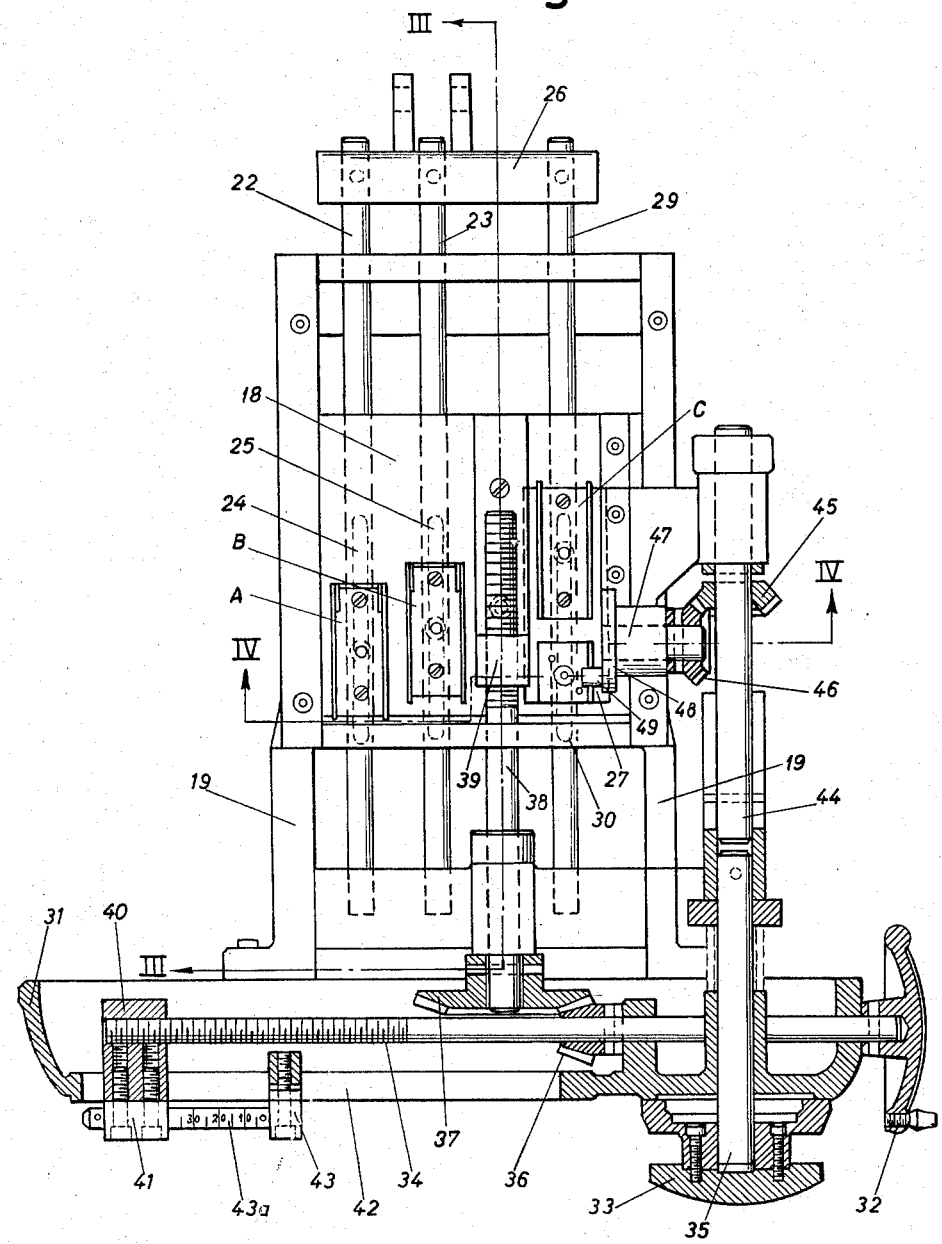
FIGURE 2 illustrates partly in view and partly in section the adjusting and indicating device of the press according to FIGURE 1.
Figure 3:
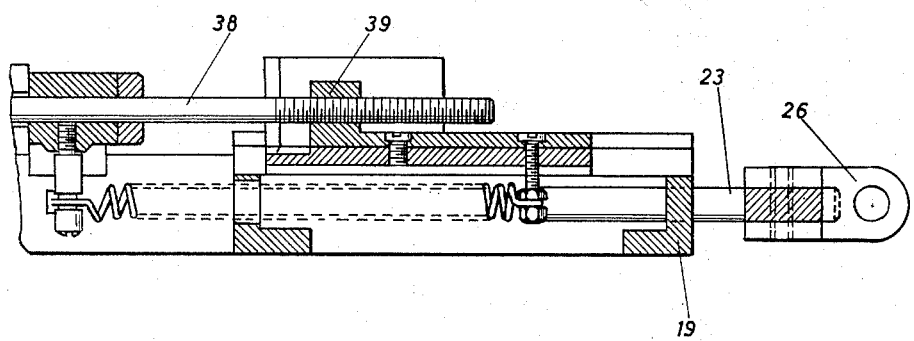
FIGURE 3 is a section taken along the line III—III of FIGURE 2.
Figure 4:
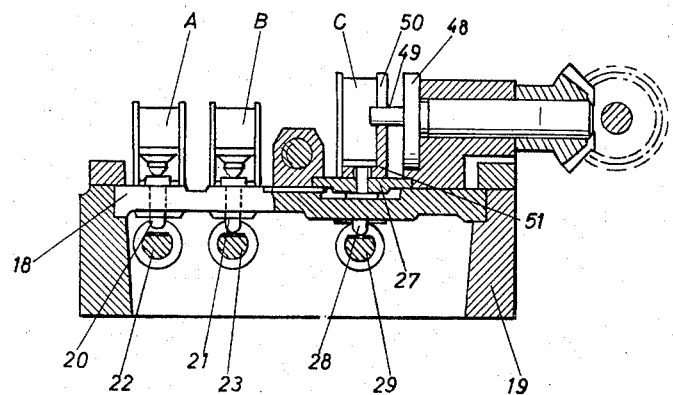
FIGURE 4 is a section taken along the line IV—IV of FIGURE 2.
Figure 5:
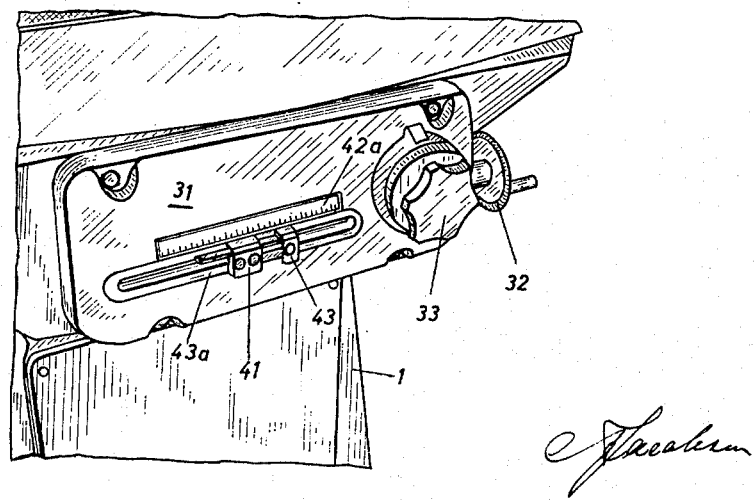
FIGURE 5 is a side view of the adjusting and indicating device according to the invention, as seen from the left in FIGURE 1.

Like the well-known machines of this type, the machine consists of a frame 1, provided in front with a work support 2, and incorporating a driving mechanism for a hydraulic press carried by the frame. The driving mechanism comprises a motor 3 whose shaft is provided with a fly wheel 4, and which is driving an oil pump 5. From here the oil is piped through an oil to a solenoid valve 6 with a steering slide 7, which opens for the oil pressure alternately over and under the hydraulic ram 8, in the pressure cylinder 9. The ram 8 drives a ram rod 10, which moves a cylindrical column 11 upwards and downwards in slide bearings in the machine frame. On the column 11 a cutting beam 12 is attached. In the example shown this cutting beam is capable of swinging in lateral direction, the column being arranged and connected with the ram rod 10 in such a manner as to be capable of turning on its longitudinal axis.

The machine is provided with a safety system comprising controls of known type, which can be switched from one-hand to two-hand operation according to the length of the cutting stroke and comprising a double hand release as shown by 12a in FIG. 1.

The steering of the cutting stroke is effected by means of a steering device acting on a switching device, which is shown in FIGS. 2–5, and whose movement is determined by the movements in vertical direction of the column 11 and consequently of the cutting beam 12, the steering device transmitting the movement by means of a two-armed lever 13a, 13b, in which the length of the arms in the example shown bears the ratio of 3 to 1. The angle-lever is pivotally mounted on a shaft 14, and the free end of the arm 13a is connected to the ram rod 10 through a slide bearing 15, while the arm 13b is articulated with a draw and press bar 16, which is adjustable longitudinally and which is provided at either end with a fork link 17a and 17b. The switch-over device itself consists of a sledge 18, resting and capable of sliding backwards and forwards on a bracket 19. The slide 18 is provided with two electric switches A and B, which are activated by means of a pin 20 and 21, respectively, which is pressed in a suitable manner, for instance by elastic force, against its respective activating rod 22 and 23, respectively, in which grooves or slots 24 and 25 are cut in a length adjusted to the movement of the rods.

The activating rods 22 and 23 are adjustably attached to a cross member 26, which through the fork link 17a is connected with the draw and press bar 16, so that the activating rods are moving backwards and forwards, sliding in bearings in the bracket 19, while at the same time the cutting beam is moving upwards and downwards, but over a distance which has been reduced in the ratio 1 to 3.

On the sledge 18 a smaller sledge 27 is arranged in such a manner as to enable it to be adjustable backwards and forwards on the sledge 18 but otherwise moving with sledge 18, when the latter is moved. The sledge 27 is provided with an electric switch C, which is fundamentally arranged exactly as switches A and B, being activated by means of a switch pin 28, resting on an activating rod 29 with a slot 30.

On the front of the frame of the machine is an adjusting device (FIGS. 2–5) arranged so as to be easily accessible and easily visible for the operator. A box-shaped cover 31 is provided with two turning knobs 32 and 33, each mounted in its respective shaft 34 and 35 with bearings in the cover 31. The shaft 34 is arranged horizontally along the front of the frame and is provided approximately at the middle with a conical gear wheel 36, which is in mesh with a conical gear wheel 37 mounted on the end of a shaft 38 shaped as a spindle, the other end of which is threaded and screwed into a threaded bushing 39 attached to the sledge 18. The gear ratio of the gearing between the gearwheels 36 and 37 is 1:3. The shaft 34 is shaped as a spindle, the end opposite to the turning knob being threaded with the same thread as the shaft 38. The spindle is in engagement with a nut 40, which carries a block 41 preventing the nut from turning with the spindle, the block sliding in a groove 42 in the cover 31 when the spindle turns. As a result of the gear ratio of the gearing between the gear wheels 36 and 37 balancing the effect of the ratio between the arms 13a and 13b of the angle-lever, the travel of the block 41 becomes equivalent to the movement of the cutting beam 12. Consequently the block in conjunction with a scale 42a, divided, for instance, in millimeters and arranged along the groove 42 is capable of indicating the lower position of the cutting beam in its true size. In the groove 42 is arranged another block 43 which can be attached securely at a position in the groove chosen at random. The block 43 is provided with a scale 43a for reading of the distance between the block itself and the block 41, the block 41 being provided with a reading mark for this purpose.

The shaft 35 is coupled to a shaft 44 arranged axially with it in such a way that the shaft 44 follows the revolution of shaft 35, but can be moved freely in axial direction in relation to the latter. Shaft 44 carries a conical gear wheel 45 which is in mesh with a conical gear wheel 46, whose shaft 47 carries a disc 48 at its other end provided with pin 49 arranged excentrically. This pin 49 engages in a slot 50 and a shoulder 51 attached to the sledge 27 so as to move the latter backwards and forwards on the sledge 18 by turning the knob 33.

The electrical circuit, which does not form part of the invention, is arranged for the three switches A, B and C to have the following functions:

A to switch over between one-hand release and two-hand release according to the length of the stroke. As a rule this switch will be adjusted for change-over to two-hand operation to be effected when the length of stroke exceeds ½".

B to determine the lower position of the ram and consequently the lower position of the cutting beam, and C to determine the upper position of the ram and consequently the upper position of the cutting beam.

Leaving out of account the effect of switch A, which is supposed to be known, a shift of the sledge 18 inwards as a result of turning the turning knob 32 will cause the switch B to be activated somewhat later than previously, the pin 21 having been farther removed from the end of the slot 25 where the pin 21 is lifted. The lower position of the cutting beam will consequently be lowered. As, however, the switch C has been moved a corresponding distance, seeing that it follows the sledge 18 the time lag between the cut-outs at B and C will remain as they were, that is, the length of stroke will remain unaltered.

On the other hand, if for instance the sledge 27 is shifted by turning the turning knob 33 in such direction as to reduce the distance between the pins 21 and 28, the cutting length will be correspondingly reduced, seeing that the switch C determines the upper position of the cutting beam.

If a cutting die to be replaced by another of a different height, the machine is dealt with as follows: The block 43 is attached securely at the point where the reading mark points to the figure in the scale 42a corresponding to the height of the cutting block measured in mm. Then the turning knob 32 is turned until the distance between the block 41 and the block 43 equals the height of the cutting die to be used. As a result of the movement being shown in its true size, the distance can be measured directly by holding the cutting die in question between the two blocks, but if the height of the cutting die is known, it is also possible to set the distance after reading of the scale 43a.

The machine can be provided with a normal cutting block and iron frame supplemented, if necessary, with a hard rubber plate or with a separate cutting bed with a pasted-on hard rubber plate.

Where double-edged cutting dies are used, the cutting plate can be provided with a rolled or cast aluminum plate.

Besides provision for adjustment of the lower depth the hydraulically driven and electrically controlled machine thus described has provision for variable length of stroke, which is of great importance for the scope of the machine. The fact is that for reasons of productivity the factories do not want to work with a larger length of stroke than strictly necessary, and as varying thickness of material are often met with, provision for varying the length of stroke is also necessary.

It is also of great importance for the length of stroke to be variable, seeing that the machine has a built-in automatic change-over mechanism between one-hand and two-hand release, the one-hand release, acting for lengths of stroke of, for instance, less than 0.5", whereas the two-hand release acts for lengths of stroke exceeding 0.5". It has not been possible to combine such an arrangement with previously known constructions.

The present invention further provides infinitely variable adjustment, which is imperative in order to work with the machine as intended, namely to be able to use different cutting dies for short periods and to adjust directly according to the height of the cutting die. As cutting dies are found in varying heights in practice and with very small variations because the die is gradually being worn or has to be ground a little, which makes it slightly lower, this is of decisive importance. An adjustment by specifically determined steps cannot be used for this purpose. The adjustment is effected by a small and easily accessible hand wheel, which on account of the structure of the whole of the system does not require interlocking of any form to prevent displacement, and this is a very considerable advantage, seeing that in working with these machines it is often necessary to readjust after different cutting dies many times a day. The fact that the indicator is linear and shows the lower position of the machine in its true size is a very useful feature, not only when the adjustment is to be made on the basis of a figure indicating the height of the cutting die, but also and particularly so when adjustment is to be made directly in accordance with the die, the exact height of which is not known.

Thus, the adjusting devices are arranged so as to enable adjustment of the machine merely by holding the cutting die between the blocks A and B and then turning the hand wheel until they rest against the die on both sides, and the machine is then adjusted exactly to the cutting die in question. The arrangements concerned thus imply considerable facility and saving of time in operating the machine as compared with the machines hitherto known of the same type.

Although I have described my invention somewhat specifically it will be understood that the present specification has been made only by way of example, and that numerous variations in the details of construction and the combination and arrangement of the individual parts may be made without departing from the idea and scope of the invention as hereinafter claimed.

What I claim is:

1. In a press comprising in combination a work support mounted on the base and a cutting beam mounted for movement to and away from the work support, hydraulic means for effecting movement of the beam in performing a pressure applying operation on sheet material to produce a blank by a cutting die disposed between the work support and the beam, and an indicator showing the lower position of the beam in full size, the said indicator comprising two blocks, one having devices for fastening in relation to a scale, and the other being slidably movable and connected to the adjusting gauge in such a way that the distance between the two blocks directly shows the height of the cutting die.

2. A press comprising in combination a work mounted on the base and a cutting beam mounted for movement to and away from the work support, drive means for effecting movement of the beam in performing a pressure applying operation on sheet material to produce a blank by a cutting die disposed between the work support and the beam, and an indicator showing the lower position of the beam, the said indicator comprising two elements, one having devices for fastening in relation to a scale, and the other being movable and connected to the adjusting gauge in such a way that the distance between the two elements directly shows the height of the cutting die.

References Cited by the Examiner

UNITED STATES PATENTS

| | | | |
|---|---|---|---|
| 876,352 | 1/1908 | Holden | 100—99 |
| 2,809,695 | 10/1957 | Novick | 83—522 X |
| 2,841,991 | 7/1958 | Saalfrank | 83—530 X |
| 3,046,874 | 7/1962 | Dehn | 83—525 X |

WILLIAM W. DYER, JR., *Primary Examiner.*

ANDREW R. JUHASZ, *Examiner.*